United States Patent [19]

Bormann

[11] 4,215,770
[45] Aug. 5, 1980

[54] CONDUCTIVE RAIL ASSEMBLY

[75] Inventor: Uwe Bormann, Rummingen, Fed. Rep. of Germany

[73] Assignee: Wampfler GmbH, Weil am Rhein-Markt, Fed. Rep. of Germany

[21] Appl. No.: 908,609

[22] Filed: May 23, 1978

[30] Foreign Application Priority Data

Sep. 1, 1977 [DE] Fed. Rep. of Germany ....... 2739481

[51] Int. Cl.² .............................................. B60M 1/30
[52] U.S. Cl. ................. 191/23 R; 191/22 R; 191/22 DM; 191/23 A
[58] Field of Search ............ 191/22 DM, 22 R, 23 A, 191/29 DM, 30, 28, 33 PM, 34, 35, 40, 44.1, 31, 25, 57, 59.1, 53, 23 R, 48, 22 C; 174/15 C, 16 B; 238/122

[56] References Cited

U.S. PATENT DOCUMENTS

| | | | |
|---|---|---|---|
| 2,918,540 | 12/1959 | Mayer | 191/23 A |
| 3,621,108 | 11/1971 | Cleaveland | 174/15 C |
| 3,709,337 | 1/1973 | Payen | 191/22 R |

FOREIGN PATENT DOCUMENTS

| | | | |
|---|---|---|---|
| 1151858 | 2/1958 | France | 174/15 C |
| 34495 | 2/1921 | Norway | 191/33 PM |

*Primary Examiner*—Trygve M. Blix
*Assistant Examiner*—Reinhard J. Eisenzopf
*Attorney, Agent, or Firm*—Pollock, Vande Sande & Priddy

[57] ABSTRACT

A guide rail assembly for transmitting electrical current to a trolley or like vehicle and comprising a pair of non-linear support rail assemblies attached to one another and formed of light-weight metallic alloys, with each support rail including a band of highly wear-resistant metal for engaging and transmitting electrical current to the trolley. At least one of the support rail assemblies further including a plurality of fin-like projections for dissipating excess heat.

11 Claims, 1 Drawing Figure

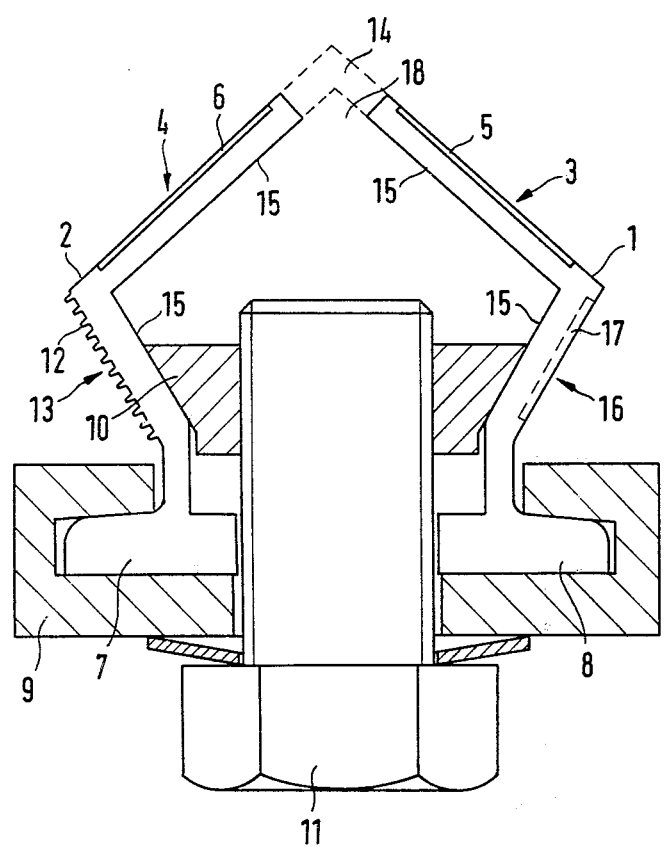

CONDUCTIVE RAIL ASSEMBLY

BACKGROUND OF THE INVENTION

The present invention concerns a new and useful rail assembly for transmitting electrical current to a trolley or similar vehicle making contact with the rail assembly.

Known current-conducting rail assemblies usually include a base member and an attached contact member formed of a highly wear-resistant material, such as steel. In one known assembly, a base member has a dual T-shaped profile and is formed of a light-weight alloy, such as aluminum. A flat steel band is attached to the base and serves as a contact track for the trolley. Because the trolley is not guided by the flat track, there exists the constant danger of the trolley separating from the contact track.

A basic problem confronting dual T-shaped rail assemblies is a phenomenon known as the "skin effect", which relates to movement of alternating current along the surface of the rail conductor. As a result, the effective area or profile actually transmitting the alternating current therethrough is substantially reduced. This shows as an apparent increase in the ohmic resistance of the conductor to alternating current, resulting in a reduced operating efficiency of the rail conductor. A further indication of the reduced efficiency is the ratio of the total cross-sectional area of the conductor to the electrical load capacity for alternating current.

In an effort to overcome these problems, a V-shaped contact track has been developed for use with a trolley having a corresponding contour. Because the V-shaped contact track must be wear resistant, it has been necessary to form the entire contact track from steel, greatly increasing the overall expense of the rail assembly without any appreciable increase in the operating efficiency.

As will be discussed in detail hereafter, applicant's new and useful invention solves the problems confronting the dual T-shaped rail assemblies without the extra expense of an extirely V-shaped steel contact track. In particular, the present invention includes a pair of non-linear support rails formed of a light-weight alloy, such as aluminum, with each curved rail supporting a flat contact band formed of a highly wear-resistant material, such as steel.

As a result, the present invention manages to increase the alternating current load capacity with a reduced profile area, while maintaining the mechanical strength of the assembly.

OBJECTS OF THE PRESENT INVENTION

An object of the present invention is to provide a current carrying rail assembly including a pair of non-linear support rail assemblies each having a contact band attached thereto.

A further object of the present invention is to provide a rail assembly adaptable for transmitting alternating current to a trolley or similar vehicle in sliding contact therewith.

Another object of the present invention is to provide a rail assembly combining a light-weight alloy support rail with at least one contact band formed of a highly wear-resistant material.

A further object of the present invention is to provide a current-carrying rail assembly which minimizes the apparent increase in electrical resistance as a function of the profile of the rail assembly.

Another object of the present invention is to provide a rail assembly which is both inexpensive to manufacture and easy to install.

These and other objects of the invention will become apparent from a reading of the following specification and claims, together with the accompanying drawing, wherein similar elements are referred to and are indicated by similar reference numerals.

BRIEF DESCRIPTION OF THE DRAWINGS

The present invention can be best understood with reference to the accompanying drawing, wherein:

The FIGURE shows a cross-sectional view of a rail assembly according to the present invention.

DETAILED DESCRIPTION OF A PREFERRED EMBODIMENT

As shown in the drawing, the guide rail assembly according to the present invention includes a pair of non-linear support rails generally indicated at 1 and 2. Support rails 1, 2 may be formed of a light-weight matallic alloy, such as aluminum.

A leg portion 3 of support rail 1 includes a contact band 5 formed of a highly wear-resistant material, such as steel. A leg portion 4 of support rail 2 also includes a similarly shaped contact band 6 which is also formed of a wear-resistant material. Bands 5 and 6 provide tracks for contacting and transmitting electrical current to a trolley or similar vehicle (not shown for purposes of clarity).

Each light alloy support rail 1 and 2 may be formed by a conventional extrusion process, with contact bands 5 and 6 being molecularly joined with their respective support members during the process. In comparison with known current-conducting rail assemblies, the total cross-sectional area of the present invention is reduced, which tends to increase the resistance to direct current. However, because of applicant's uniquely shaped structure, the resistance to alternating current loads is actually reduced by approximately one-half as compared to known assemblies. This results in the overall alternating current load capacity being increased by as much as 30%.

Referring again to the drawing, support rails 2 and 1 each includes an intergrally attached support flange member 7 and 8, respectively, with each flange member extending in a horizontal direction to provide a base for supporting and joining support rails 1 and 2. Pairs of connectors 9 and 10 may be longitudinally spaced along the rail assembly to join support rails 1 and 2 together.

Connector 9 includes a dual L-shaped profile and is inserted over portions of flanges 7 and 8, while connector 10 forms a conically shaped clip which is positioned between rails 1 and 2. A screw 11 extends through aligned apertures formed through connectors 9 and 10 and rotates to draw connector 10 into abutting support with rails 1 and 2.

Support rails 1 and 2 each includes a further leg portion 16 and 13, respectively, wherein leg portion 16 extends between leg portion 3 and attached flange portion 8, while leg portion 13 extends between leg portion 4 and attached flange 7. Leg portions 3 and 16 form a V-shaped profile with leg portions 4 and 13 also forming a V-shaped profile. In order to dissipate heat generated by electrical current passing through support rail 2, a plurality of fin-like projections 12 may extend from the surface of leg portion 13. In a similar manner, support rail 1 may also be formed with a plurality of fin-like projections extending from leg portion 16 (not shown).

During operation, a trolley is guided within an open slot 18 formed by the support rails 1 and 2. The trolley may include a contact assembly (not shown) which makes electrical contact with bands 5 and 6. Alternatively, the trolley may be designed to contact only one support rail, making electrical contact with band 5 and with a further wear-resistant band 17 attached to leg portion 16 as shown in phantom.

In a further alternative embodiment, leg portions 3 and 4 of support rails 1 and 2 may be joined as shown in phantom at 14 to provide a single guide rail assembly.

Each of the preferred embodiments discloses a support rail assembly having a profile which provides a satisfactory mechanical bending strength. Although the total profile has been reduced when compared with known assemblies, the load-carrying capacity for alternating current has been found to increase by more than 30%. Furthermore, the specific profile shape offers the additional benefit of a V-shaped guide rail assembly wherein the support rail is manufactured from a light weight alloy, with only the actual contact band being formed of a steel-like material.

The present invention is not to be limited to the above described embodiments, but is to be limited only by the scope of the following claims.

What is claimed is:

1. A rail guide assembly uniquely constructed for maintaining electrical contact with a trolley-like vehicle without allowing the buildup of excessive heat within said rail guide assembly, and comprising:

first and second spaced rail guide assemblies extending substantially parallel to one another, each of said rail guide assemblies having a substantially constant thickness and a substantially V-shaped profile with closed end portions of said V-shaped profiles extending substantially away from one another;

each of said first and second rail guide assemblies further including a separate support flange attached to a respective first end portion thereof, with said flange members and said respective first end portions extending substantially perpendicular to one another;

at least one band of conductive material extending along a surface of said first V-shaped rail guide assembly facing substantially away from said second V-shaped rail guide assembly and at least one separate band of conductive material extending along a surface of said second V-shaped rail guide assembly facing substantially away from said first V-shaped rail guide assembly, wherein said bands of conductive material engage and transmit electrical current to a trolley-like vehicle in contact therewith;

first connector means for enclosing and supporting said separate flange members, said first connector means including an aperture extending therethrough, with a fastener projecting through said aperture and into the space between said first and second spaced rail guide assemblies; and second connector means positioned between said first and second rail guide assemblies and adjustably mounted on said fastener for contacting and wedging said first and second rail guide assemblies substantially away from one another to secure and maintain engagement between said bands of conductive material and said trolley-like vehicle.

2. A guide rail assembly according to claim 1, wherein said first V-shaped support rail assembly includes a pair of attached leg sections extending at an angle to one another;

and said second V-shaped support rail assembly also includes a pair of attached leg sections extending at an angle to one another.

3. A rail guide assembly according to claim 2, wherein at least one band of conductive material is attached to one of said attached leg sections forming said first V-shaped support rail assembly and at least one further band of conductive material is attached to one of said attached leg sections forming said second V-shaped support rail assembly.

4. A rail guide assembly according to claim 3, wherein said bands of conductive material are attached to leg sections inclined toward one another.

5. A guide assembly according to claim 1, wherein said support rail assemblies are formed of light-weight metallic alloys.

6. A rail guide assembly according to claim 5, wherein said support rail assemblies are formed out of aluminum.

7. A rail guide assembly according to claim 1, wherein said first and second V-shaped support rail assemblies include second end portions spaced from one another to form a guide slot therebetween.

8. A rail guide assembly according to claim 1, wherein said first and second V-shaped support rail assemblies include second end portions integrally jointed to one another.

9. A guide rail assembly according to claim 1 wherein said band-shaped members are formed of a highly wear-resistant material.

10. A guide rail assembly according to claim 1 wherein said band-shaped members are formed of steel.

11. A guide rail assembly according to claim 1, wherein at least one of said support rails includes a plurality of fin-shaped projections extending from a surface to dissipate excess heat.

* * * * *